US012235655B2

(12) United States Patent
Vemuri et al.

(10) Patent No.: US 12,235,655 B2
(45) Date of Patent: Feb. 25, 2025

(54) MANAGEMENT OF CHARGING SCHEDULES IN FLEET HAVING ELECTRIC VEHICLES

(71) Applicant: GM GLOBAL TECHNOLOGY OPERATIONS LLC, Detroit, MI (US)

(72) Inventors: Venkata Naga Siva Vikas Vemuri, Famington Hills, MI (US); Omer Tsimhoni, Bloomfield Hills, MI (US); Andrew J. MacDonald, Grosse Pointe Park, MI (US); Vishnu Chikondla, Novi, MI (US); Charles A. Everhart, Canton, MI (US); Rajas M. Sevekari, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

(21) Appl. No.: 17/894,368

(22) Filed: Aug. 24, 2022

(65) Prior Publication Data
US 2024/0069568 A1    Feb. 29, 2024

(51) Int. Cl.
G05D 1/00       (2024.01)
B60L 53/10      (2019.01)
G06Q 10/0631    (2023.01)

(52) U.S. Cl.
CPC ............ *G05D 1/0291* (2013.01); *B60L 53/10* (2019.02); *G06Q 10/0631* (2013.01)

(58) Field of Classification Search
CPC ... G05D 1/0291; B60L 53/10; B60L 2240/62; B60L 2240/622; B60L 53/305;
(Continued)

(56) References Cited

U.S. PATENT DOCUMENTS

2020/0254897 A1*  8/2020  Loghavi ................. B60L 53/67
2020/0269721 A1*  8/2020  Vidhi ...................... B60L 58/13
(Continued)

FOREIGN PATENT DOCUMENTS

WO     WO2019222369 A1 *  5/2019 ............... H02J 7/00

OTHER PUBLICATIONS

U. Kumar Debnath, I. Ahmad, D. Habibi and A. Yousuf Saber, "Improving Battery Lifetime of Gridable Vehicles and System Reliability in the Smart Grid," in IEEE Systems Journal, vol. 9, No. 3, pp. 989-999, Sep. 2015, doi: 10.1109/JSYST.2013.2294734. (Year: 2015).*
(Continued)

*Primary Examiner* — Russell Frejd
*Assistant Examiner* — Brittany Renee Peko
(74) *Attorney, Agent, or Firm* — Quinn IP Law

(57) ABSTRACT

A system of managing charging schedules in a fleet having electric vehicles includes a command unit. The command unit has a processor and tangible, non-transitory memory on which instructions are recorded. The command unit is adapted to define a plurality of discharge categories, including a transportation category, a transfer category and a reserve energy category. The respective battery power in the electric vehicles is proportioned by setting a respective percentage allocation for the plurality of discharge categories. The command unit is adapted to signal the electric vehicles to charge when at least one of the plurality of discharge categories falls below the respective percentage allocation. The command unit may be adapted to group the electric vehicles in respective virtual boxes based in part on their respective physical locations.

12 Claims, 8 Drawing Sheets

(58) Field of Classification Search
CPC .......... B60L 53/63; B60L 53/67; B60L 53/68; B60L 53/00; B60L 55/00; B60L 58/10; G06Q 10/0631; G06Q 10/06312; G06Q 10/06313; G06Q 10/06315; G06Q 50/06
See application file for complete search history.

(56) References Cited

U.S. PATENT DOCUMENTS

| | | | |
|---|---|---|---|
| 2022/0410750 A1* | 6/2022 | Mangal | B60L 53/62 |
| 2023/0038012 A1* | 2/2023 | Erozlu | G01C 21/3469 |
| 2023/0094216 A1* | 3/2023 | Diamond | B60L 53/63 |
| 2023/0142941 A1* | 5/2023 | Books | B60L 1/08 |
| 2023/0339357 A1* | 10/2023 | Chaykowsky | B60L 53/67 |
| 2024/0034170 A1* | 2/2024 | Brannan | B60L 53/36 |
| 2024/0046797 A1* | 2/2024 | Lu | G08G 1/202 |
| 2024/0097467 A1* | 3/2024 | Murai | H02J 7/0068 |

OTHER PUBLICATIONS

S. Al-Rubaye, A. Al-Dulaimi and Q. Ni, "Power Interchange Analysis for Reliable Vehicle-to-Grid Connectivity," in IEEE Communications Magazine, vol. 57, No. 8, pp. 105-111, Aug. 2019, doi: 10.1109/MCOM.2019.1800657. (Year: 2019).*

H. Turker and S. Bacha, "Optimal Minimization of Plug-In Electric Vehicle Charging Cost With Vehicle-to-Home and Vehicle-to-Grid Concepts," in IEEE Transactions on Vehicular Technology, vol. 67, No. 11, pp. 10281-10292, Nov. 2018, doi: 10.1109/TVT.2018.2867428. (Year: 2018).*

* cited by examiner

MANAGEMENT OF CHARGING SCHEDULES IN FLEET HAVING ELECTRIC VEHICLES

INTRODUCTION

The present disclosure relates generally to a system and method for managing charging schedules in a fleet having electric vehicles. Fleet vehicles are groups of vehicles used and/or owned by an entity such as an organization, a business or a public agency. Fleet vehicles have become increasingly common. Examples of fleet vehicles include those operated by car rental companies, taxis or public buses, and police departments. Additionally, many online retailers may purchase or lease fleet vehicles to deliver products or packages to customers, or to enable sales representatives to travel to clients. Electric-powered fleet vehicles pose unique challenges compared to fleets employing internal combustion engines, such as issues related to infrastructure availability and range anxiety.

SUMMARY

Disclosed herein is a system for managing charging schedules in a fleet having electric vehicles. The system includes a command unit having a processor and tangible, non-transitory memory on which instructions are recorded. The command unit is adapted to define a plurality of discharge categories, including a transportation category, a transfer category and a reserve energy category. The respective battery power in the electric vehicles is proportioned by setting a respective percentage allocation for the plurality of discharge categories. The command unit is adapted to signal the electric vehicles to charge when at least one of the plurality of discharge categories falls below its respective percentage allocation.

The transportation category includes propulsion energy for the electric vehicles and non-propulsion energy for respective vehicle accessories. The transfer category may include vehicle-to-grid (V2G) energy transfers. The transfer category may include vehicle-to-load (V2L) energy transfers. The transfer category may include vehicle-to-home (V2H) energy transfers.

The command unit may be adapted to group the electric vehicles in respective virtual boxes based in part on respective physical locations of the electric vehicles. In some embodiments, the command unit is adapted to determine whether a respective total battery charge level is greater than a total power demand in the respective virtual boxes. When the total power demand exceeds the respective total battery charge level, energy transfer is requested from at least one of the electric vehicles within an adjacent one of the respective virtual boxes.

In some embodiments, the command unit is adapted to send an alert when a number of the electric vehicles having an idle status in the respective virtual boxes is greater than a respective threshold value. An alert is sent when a total charge level of the electric vehicles having the idle status is greater than a predetermined threshold level. The command unit may be adapted to search for a target charging station in proximity to a path when the electric vehicles having an idle status are in motion along the path. When the electric vehicles having the idle status are not in motion, the electric vehicles having an idle status are matched with the target charging station within the respective virtual boxes.

The command unit may be adapted to send an alert to the electric vehicles in the respective virtual boxes if a current power demand for the respective virtual boxes is projected to increase when the electric vehicles are not on a planned route. The command unit may be adapted to match the electric vehicles with a driverless status to respective target charging stations. Energy transfer is requested from the electric vehicles with a driver-operated status to the electric vehicles with the driverless status when the respective target charging stations are not available.

Disclosed herein is a method for managing charging schedules in a fleet having electric vehicles. The method includes installing a command unit with a processor and tangible, non-transitory memory on which instructions are recorded. The method includes defining a plurality of discharge categories for each of the electric vehicles, including a transportation category, a transfer category and a reserve energy category, via the command unit. The method includes proportioning respective battery power in the electric vehicles by setting a respective percentage allocation for the plurality of discharge categories and directing the electric vehicles to charge when at least one of the plurality of discharge categories falls below the respective percentage allocation, via the command unit.

The above features and advantages and other features and advantages of the present disclosure are readily apparent from the following detailed description of the best modes for carrying out the disclosure when taken in connection with the accompanying drawings.

Figure 1:
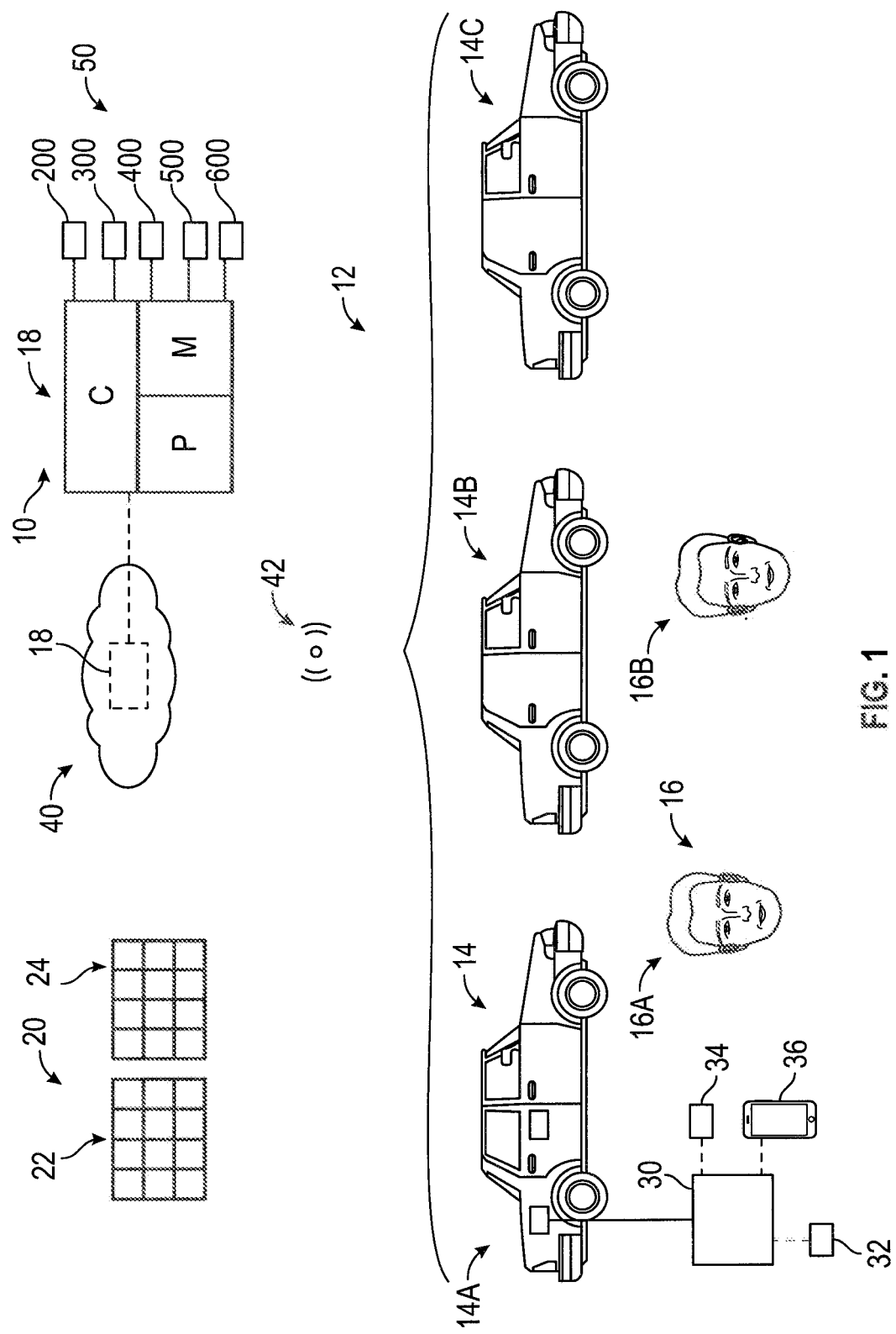
FIG. 1 is a schematic fragmentary diagram of a system for managing electric-powered fleet vehicles, the system having a command unit.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for managing charging schedules in a fleet 12 having electric vehicles 14, e.g., first electric vehicle 14A, second electric vehicle 14B and third electric vehicle 14C. The electric vehicles 14 may be purely electric or partially electric/hybrid. The electric vehicles 14 may include, but are not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), train or another moving platform. It is to be understood that the electric vehicles 14 may take many different forms and have additional components. The fleet 12 may include other vehicles with an internal combustion engine (ICE).

Fleet managers may assign fleet tasks to the electric vehicles 14 and drivers 16 (e.g., drivers 16A, 16B shown in FIG. 1) based on various factors, including the availability of charging stations 20 along the route taken by the fleet 12 in completing each task. Some of the electric vehicles 14 may be driverless or fully autonomous (e.g., vehicle 14C). The charging stations 20 may include both fleet charging stations 22 and public charging stations 24. Public charging stations 24 are typically found street-side or at retail shopping centers, public facilities, and other parking areas.

Charging schedules for a fleet 12 of electric vehicles 14 generally follow a need-based approach. In other words, the electric vehicles 14 are scheduled for charging when they respectively reach a predefined low-charge state. However, this approach does not account for many other factors. As described below, the system 10 enables pre-emptive scheduling of electric vehicles 14 (for charging) when there are changes in the proportion of battery power being used for a particular discharge category. In other words, the system 10 does not wait to charge the electric vehicles 14 until they reach the predefined low-charge state.

Referring to FIG. 1, the system 10 includes a command unit 18 having an integrated controller C with at least one processor P and at least one memory M (or non-transitory, tangible computer readable medium) on which instructions may be recorded for selectively executing one or more modules 50 that provide an optimal charging schedule for the fleet 12. The memory M can store controller-executable instruction sets, and the processor P can execute the controller-executable instruction sets stored in the memory M.

The system 10 (via execution of the modules 50) enables management of power needs in the fleet 12 by proportioning the battery power based on power application needs and establishing a feedback mechanism based on throughput success. The system 10 reduces idling time for the electric vehicles by increasing the mobile charge capability for the fleet 12.

The modules 50 include a Proportion Monitoring Module 200, a Circle Aggregation Module 300, an Idle Flow Module 400, a Station Mapping Module 500 and an Autonomy Module 600, described below with respect to FIGS. 3-8, respectively. Each of the modules 50 may be embodied as computer-readable code or instructions stored on and partially executable by the controller C of FIG. 1. It is understood that the modules 50 are each independent and may or may not be concurrently executed by the command unit 18.

Figure 2:
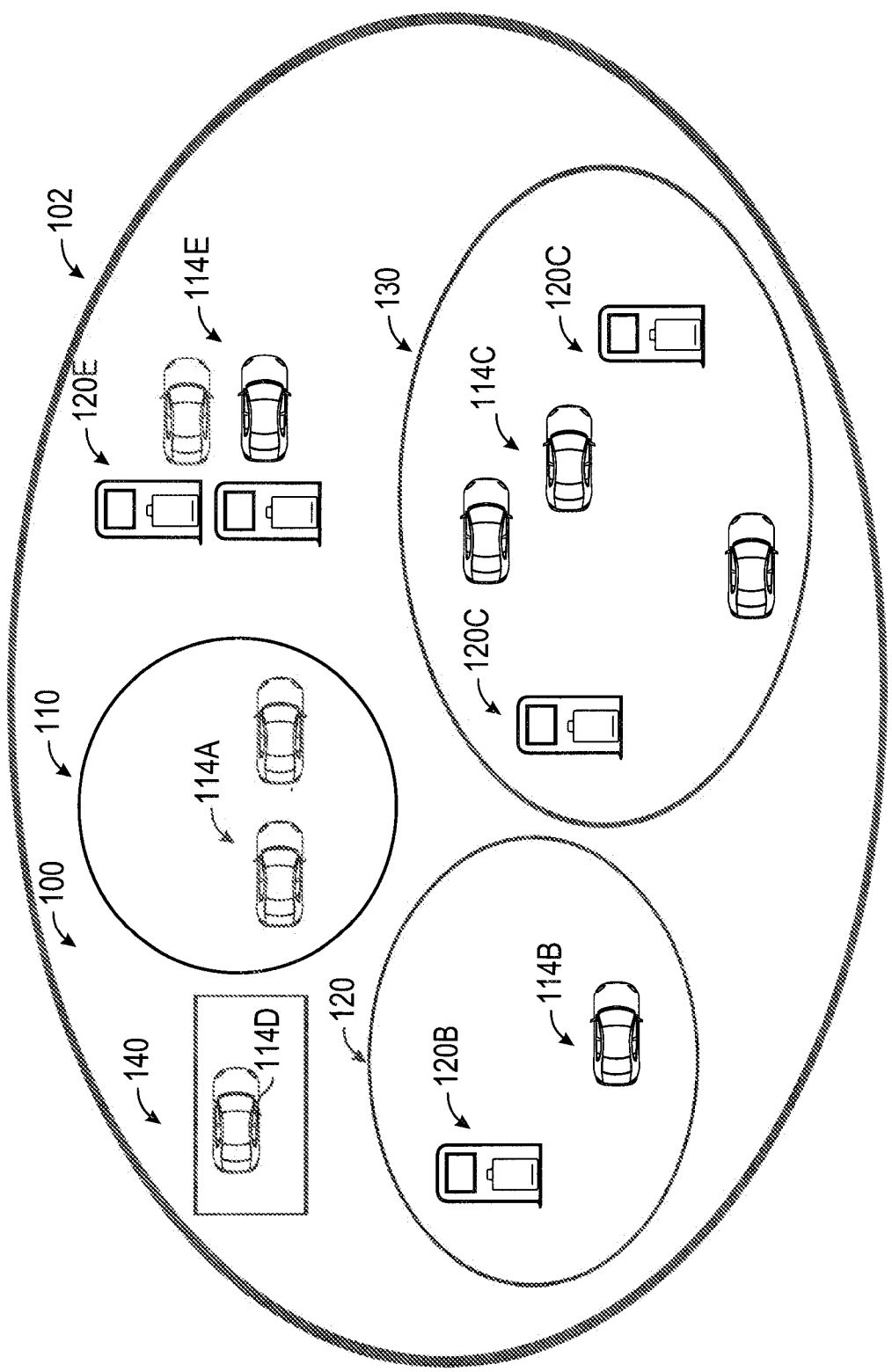
FIG. 2 is a schematic example of virtual boxes employable by the system of FIG. 1.

Referring to FIG. 2, the electric vehicles 14 in the fleet 12 may be divided into a plurality of virtual boxes 100 ("plurality of" omitted henceforth) encapsulated within a global box 102. The command unit 18 may respectively group the electric vehicles 14 in the virtual boxes 100 based in part on their physical locations. As shown in FIG. 2, the virtual boxes 100 may include a first box 110 with vehicles 114A, a second box 120 with vehicles 114B and charging stations 120B, a third box 130 with vehicles 114C and charging stations 120C, and a fourth box 140 with a vehicle 114D. Some of the electric vehicles (e.g., vehicle 114D) may be idle and some of them may be in the course of performing a fleet task or assignment. The global box 102 may include a fleet headquarters or fleet parking area with charging stations 120E and electric vehicles 114E that are waiting for fleet assignments.

As described below, the system 10 distributes the intra-fleet charge power to even out power between the virtual boxes 100 that have a higher power demand relative to others that have a lower power demand. The shape and size of the virtual boxes 100 may be varied and may include circles, ellipses, rectangles etc. For example, the first box 110 may be a circle with a radius of 5 miles. The modules 50 of FIG. 1 may be executed for the electric vehicles 14 individually or for a group of electric vehicles 14 within the same virtual box.

Referring to FIG. 1, the electric vehicles 14 each include respective vehicle controllers 30 collecting information from a network of sensors 32 inside the electric vehicles 14. Referring to FIG. 1, the electric vehicles 14 may include a respective telematics control unit 34 for establishing two-way communications with the command unit 18, including recording and transmitting vehicle data. For example, the respective telematics control unit 34 may collect telemetry data from the electric vehicles 14, such as location, speed, engine data, maintenance requirements and servicing, by interfacing with various internal sub-systems. The respective telematics control unit 34 may enable vehicle-to-vehicle (V2V) communication and/or a vehicle-to-everything (V2X) communication.

Referring to FIG. 1, the electric vehicles 14 may respectively include a mobile application 36 for communicating with the command unit 18. The mobile application 36 may be embedded in a smart device (e.g., smart phone) belonging to a user of the electric vehicles 14, which may be plugged in or otherwise linked to the electric vehicles 14. The mobile application 36 may be physically connected (e.g., wired) to the electric vehicles 14 as part of the vehicle infotainment unit. The circuitry and components of a mobile application ("apps") available to those skilled in the art may be employed.

Referring to FIG. 1, the command unit 18 may be stored in an "off-board" or remotely located cloud computing service 40. The cloud computing service 40 may include one or more remote servers hosted on the Internet to store, manage, and process data. The cloud computing service 40 may be at least partially managed by personnel at various locations, such as at a "back office." The cloud computing service 40 may be a private or public source of information maintained by an organization, such as for example, a research institute, a company, a university and/or a hospital.

The system 10 may employ a wireless network 42 for communications between the electric vehicles 14 and the command unit 18, shown in FIG. 1. The wireless network 42 may be a short-range network or a long-range network. The wireless network 42 may be a communication BUS, which may be in the form of a serial Controller Area Network (CAN-BUS). The wireless network 42 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 42 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 3:
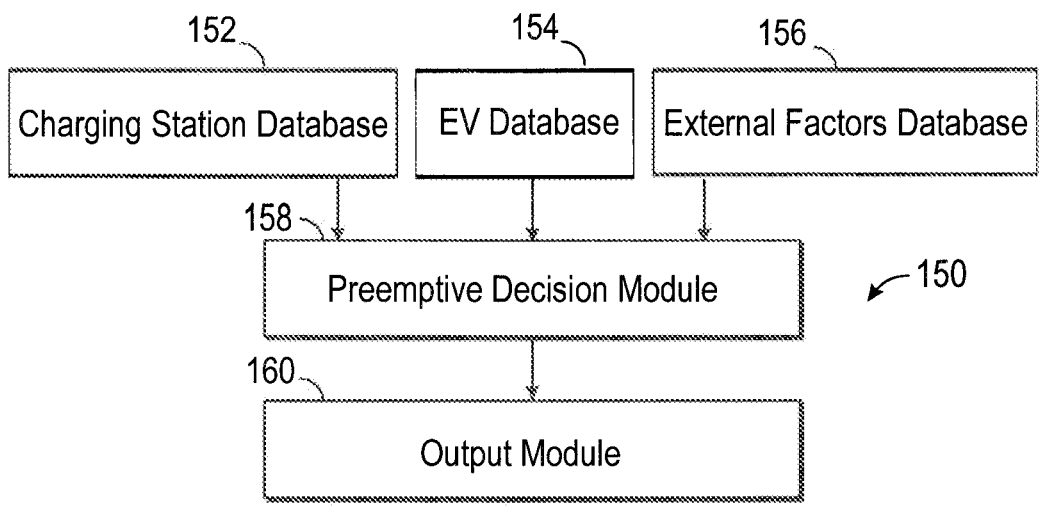
FIG. 3 is a schematic diagram of an example architecture employable by the system of FIG. 1.

An example overall architecture 150 for the system 10 is shown in FIG. 3. Referring to FIG. 3, respective data from a Charging Station Database 152, Electric Vehicle (EV) Database 154 and External Factors Database 156 are inputted into a Preemptive Decision Module 158. The Charging Station Database 152 provides input related to charging station availability, fast charging availability and rates of charge. The EV Database 154 covers respective battery charge levels of the electric vehicles 14, battery age charging cycles, the fleet charge type, the fleet capacity, the level of autonomy, the mobility status and route status of the electric vehicles 14. The External Factors Database 156 provides input related to the time of day, day of month, weather, probability of fleet demand for each of the virtual boxes 100, and detour time to suitable charging stations 20.

Referring to FIG. 3, an Output Module 160 receives the results of the Preemptive Decision Module 158. The Preemptive Decision Module 158 may be updated at regular intervals or triggered by specific events. The triggers may include a change in status of at least one of the electric vehicles 14 (e.g., change in availability and battery status), a change in status of at least one driver 16 (e.g., on duty, assigned/not assigned) and a change in status of a task (e.g., modified task location or changed deadline).

Figure 4:
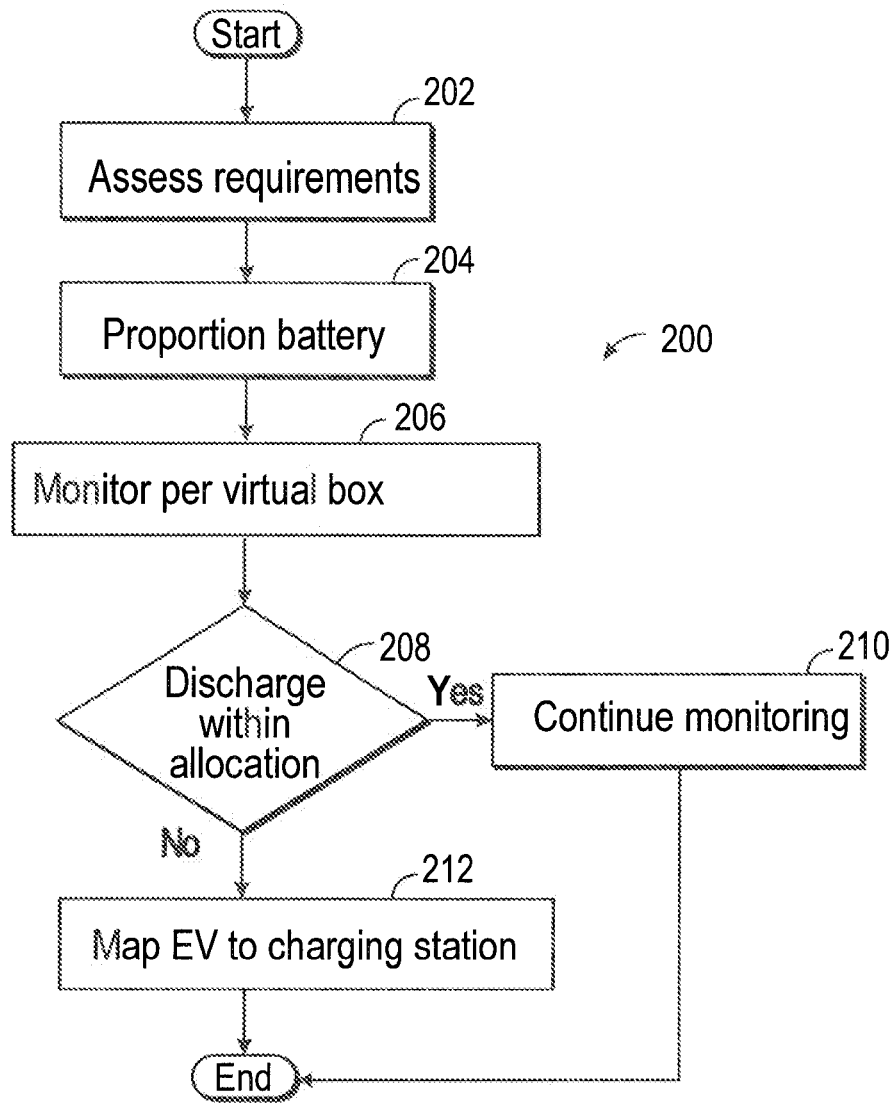
FIG. 4 is a flowchart for a first module executable by the command unit of FIG. 1.

Referring now to FIG. 4, an example flowchart of the Proportion Setting Module 200 is shown. The Proportion Setting Module 200 may be dynamically executed and need not be applied in the specific order recited herein. Furthermore, it is to be understood that some steps may be eliminated. The Proportion Monitoring Module 200 involves proportioning battery power based on dynamic discharge categories.

Per block 202 of FIG. 4, the command unit 18 is programmed to assess the energy requirements of the electric vehicles 14, either individually or collectively. For example, the command unit 18 may run a discharge demand algorithm to gauge the energy usage of the electric vehicles 14 and to determine the different percentages to be allocated to the various needs/categories. Advancing to block 204, the command unit 18 is adapted to proportion the battery power based on the assessment of block 202, in other words, optimize the battery proportions based on dynamic discharge needs.

In one embodiment, the battery power is allocated between a transportation category (for propulsion and non-propulsion vehicle needs), a transfer category and a reserve category. The transportation category covers propulsion requirements and non-propulsion requirements within the vehicle, such as running a heating, ventilation and cooling (HVAC) unit or an infotainment unit.

The transfer category (via bi-directional charging) covers several types of usage, such as V2G (vehicle to grid), V2L (vehicle to load) and V2H (vehicle to home). In this category, the electric vehicles 14 operate as a portable battery pack, providing power to devices or loads via a plug-in adapter. This allows the electric vehicles 14 to be charged at cheaper off-peak times and discharged at high demand or expensive peak times. V2G involves transferring energy from the electric vehicles 14 to stabilize the grid. V2H involves transferring energy from the electric vehicles 14 to power a home or business. V2L involves transferring energy from the electric vehicles 14 to a load, such as a trailer or electrical equipment, for example.

In a non-limiting example, the battery power may be proportioned as 45%, 35% and 20%, respectively, between the transportation, transfer and reserve categories. In this example, the transfer category it may be further proportioned between V2V, V2H and V2G, e.g., as 15%, 5% and 15%, respectively.

Proceeding to block 206, the command unit 18 may adjust the battery proportions set in block 204, based on dynamic discharge demands for each of the virtual boxes 100. For example, if a particular virtual box is in an urban area with tremendous traffic, the proportions in that virtual box may be adjusted to allow a higher allocation for the transportation category.

Advancing to block 208, the command unit 18 is programmed to determine whether the discharge categories are within their percent allocations in each of the electric vehicles 14. If not (block 208=NO), for example, if transportation discharge has exceeded its percent allocation, the Module 200 proceeds to block 212 where the electric vehicle 14 in question is signaled to charge. For example, the electric vehicle 14 may be directed or mapped to the best available charging station. If so (block 208=YES), the command unit 18 continues monitoring the buffer proportions (per block 210) and the Module 200 is ended.

Figure 5:
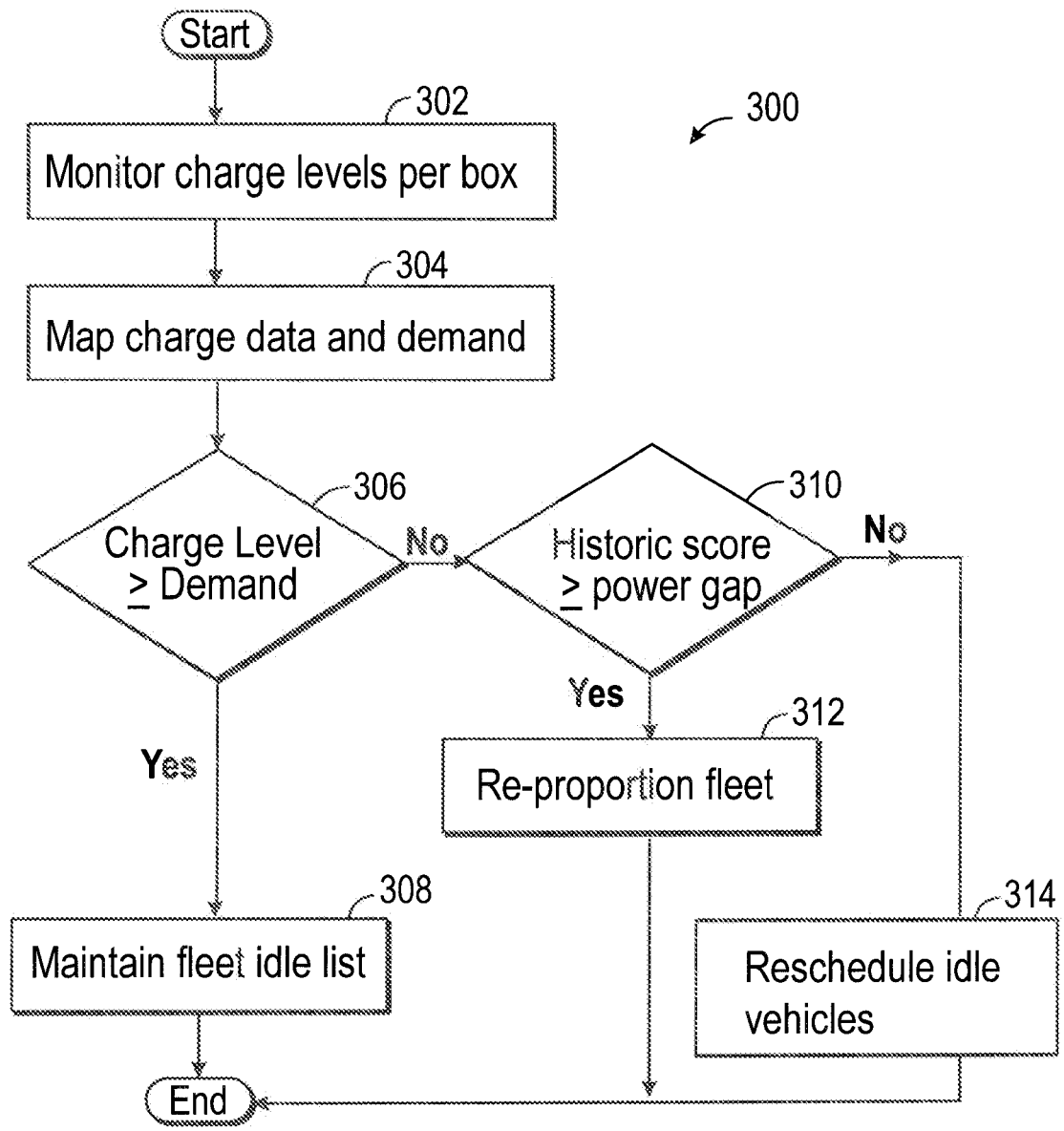
FIG. 5 is a flowchart for a second module executable by the command unit of FIG. 1.

Referring now to FIG. 5, an example flowchart of the Circle Aggregation Module 300 is shown. The Circle Aggregation Module 300 may be dynamically executed and need not be applied in the specific order recited herein. Furthermore, it is to be understood that some steps may be eliminated. The Circle Aggregation Module 300 represents aggregated proportion management for the virtual boxes 100.

Per block 302 of FIG. 5, the command unit 18 is adapted to dynamically monitor the total battery charge level for each of the virtual boxes 100, by summing up the charge levels of the electric vehicles 14 within the virtual boxes 100. Advancing to block 304, the command unit 18 respectively maps the total battery charge data relative to the total power demand for the virtual boxes 100. Proceeding to block 306, the command unit 18 determines whether there is a respective power gap, i.e., whether the total battery charge level exceeds the total power demand respectively for the virtual boxes 100.

If so (block 306=YES), the Module 300 proceeds to block 308 where a list of the electric vehicles 14 having an idle status (or near-idle status) is compiled. If not, (block 306=NO), and there is a power gap, the Module 300 proceeds to block 310 to determine how many of electric vehicles 14 within the same virtual box have high historic performance scores (i.e., are efficient in accomplishing their assigned tasks with minimum resources).

Block 310 includes determining whether the number of those electric vehicles 14 is greater than a predetermined percentage of the power gap. If so (block 310=YES), the command unit 18 reschedules or reproportions the electric vehicles 14 (per block 312) within the same virtual box based on the amount of power needed, e.g., facilitating V2V energy transfer from higher-performing ones of the electric vehicles 14 to the lower performing ones. If not (block 310=NO), Module 300 proceeds to block 314, where the command unit 18 reproportions electric vehicles 14 that have an idle status in adjacent ones of the virtual box 100 based on the amount of power needed, for example, to facilitate V2V energy transfer from those electric vehicles 14. Module 300 is then ended.

Figure 6:
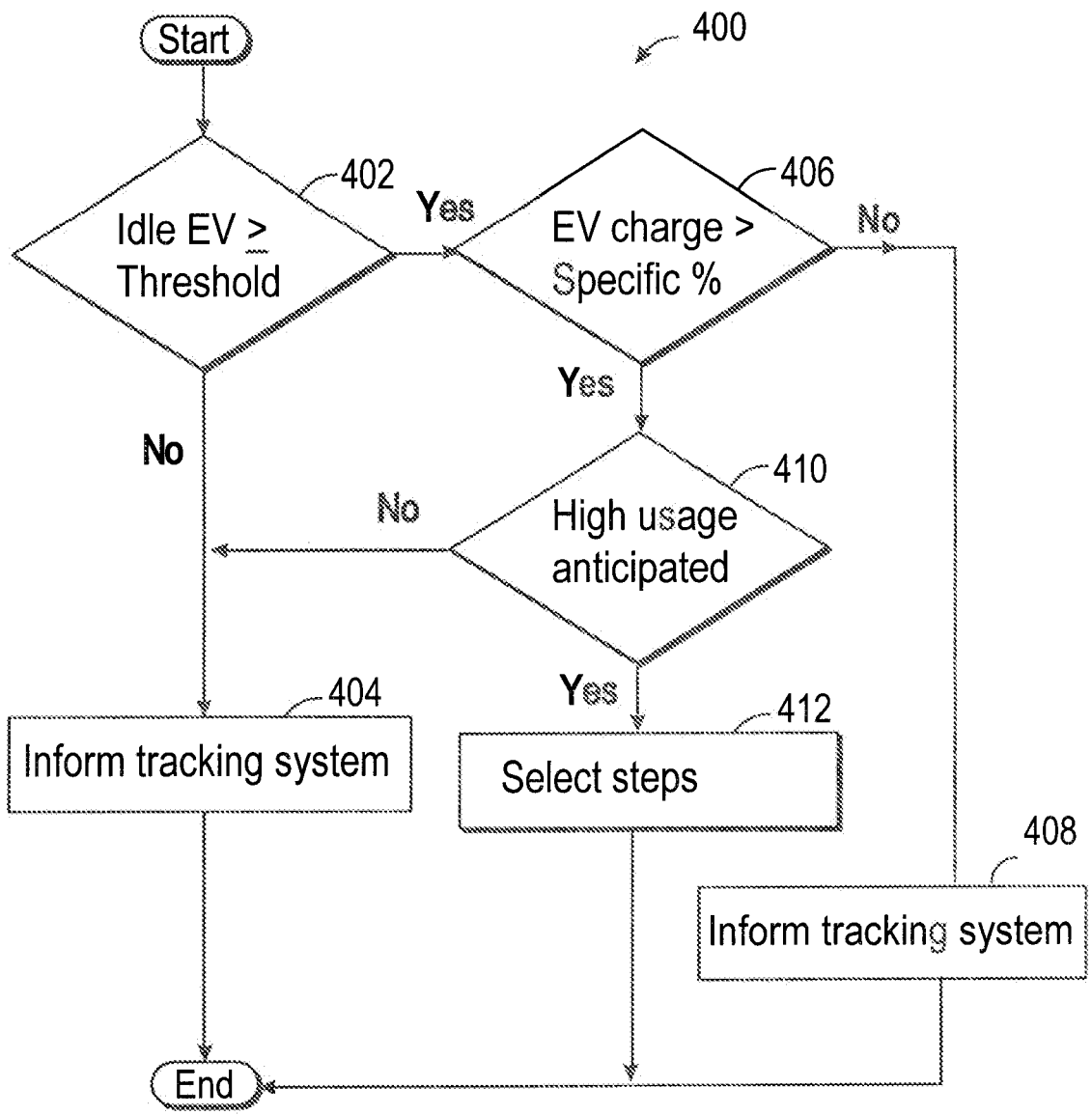
FIG. 6 is a flowchart for a third module executable by the command unit of FIG. 1.

Referring now to FIG. 6, an example flowchart of the Idle Flow Module 400 is shown. The Idle Flow Module 400 may be dynamically executed and need not be applied in the specific order recited herein. Furthermore, it is to be understood that some steps may be eliminated. The Idle Flow Module 400 optimizes the flow of electric vehicles 14 having an idle status.

Per block 402, the command unit 18 is adapted to determine whether the number of electric vehicles 14 having an idle status in the virtual boxes 100 is greater than a respective threshold value. If not (block 402=NO), the Module 400 proceeds to block 404 where the command unit 18 sends an alert to a tracking database (e.g., EV Database 154) and the Module 400 is ended.

If so (block 402=YES), the Module 400 proceeds to block 406 where the command unit 18 is adapted to determine whether the charge level of the electric vehicles 14 having an idle status is greater than a predetermined or specific percentage (e.g., 65% charge). If not (block 406=NO), the Module 400 proceeds to block 408 where the command unit 18 sends an alert to a tracking database (e.g., EV Database 154) and the Module 400 is ended. If the charge level of the electric vehicles 14 having an idle status is greater than the specific percentage (block 406=YES) in one of the virtual boxes 100, the command unit 18 proceeds to block 410 to determine if high usage (or increased power demand ascertained through a predictive demand algorithm) is expected in that virtual box 100. If high usage is not expected (block 410=NO), the Module 400 loops back to block 404.

If high usage is expected (block 410=YES), the Module 400 proceeds to block 412 to select a number of steps. Per block 412, if the electric vehicles 14 that have an idle status are in motion, the command unit 18 searches for target charging stations 20 in their path and directs them there. The target charging stations 20 are defined as those that are high performing/efficient and may charge the electric vehicles 14 in the least amount of time. If the electric vehicles 14 that have an idle status are not in motion, the command unit 18 matches them with target charging stations 20 within their virtual box 100 and sends this information (with the route and station information) to the electric vehicle 14 in question. Module 400 is then ended.

Figure 7:
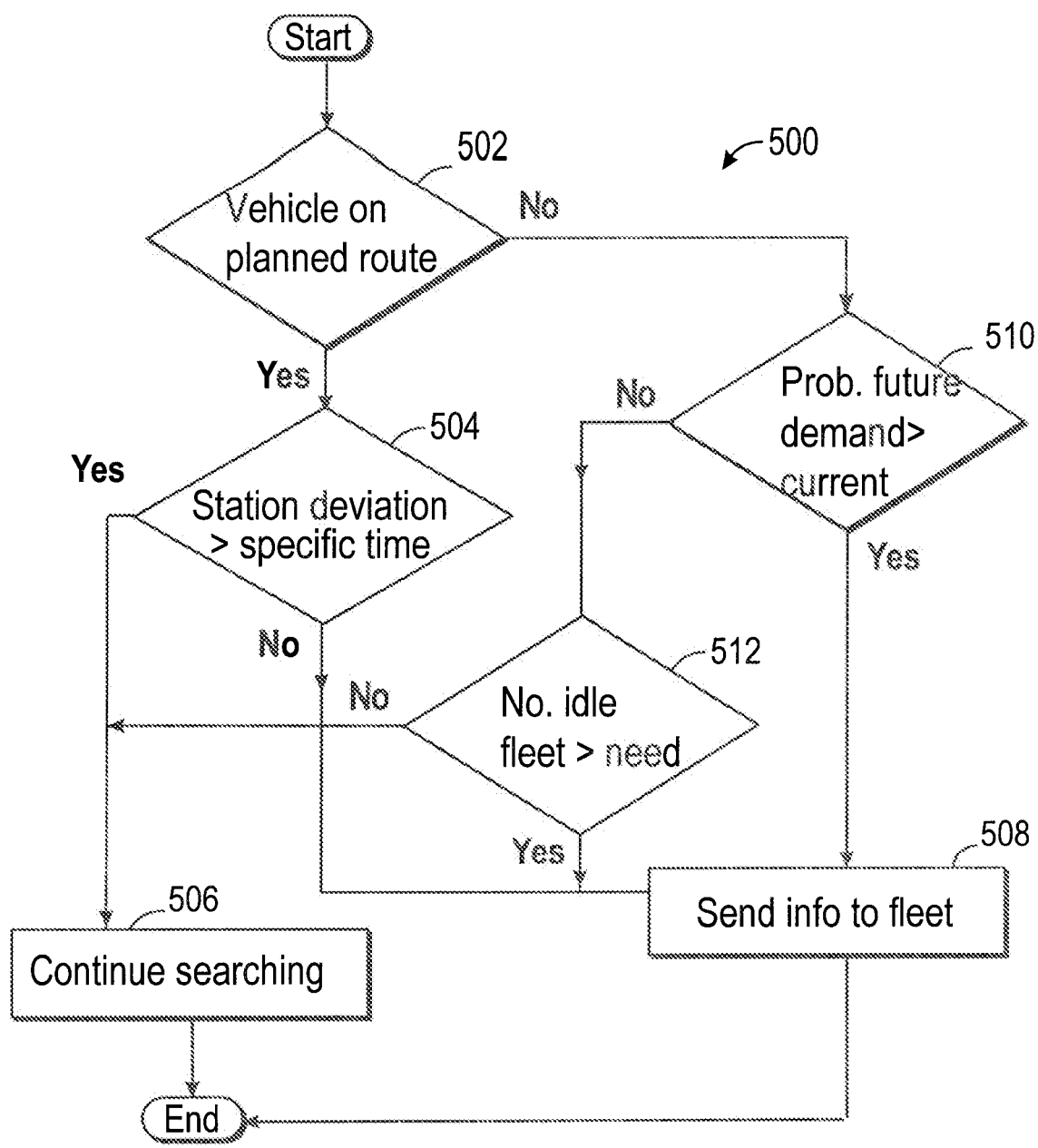
FIG. 7 is a flowchart for a fourth module executable by the command unit of FIG. 1.

Referring now to FIG. 7, an example flowchart of the Station Mapping Module 500 is shown. The Station Mapping Module 500 may be dynamically executed and need not be applied in the specific order recited herein. Furthermore, it is to be understood that some steps may be eliminated. The Station Mapping Module 500 involves mapping of the dynamic fleet to charging stations 20 and optimizes the scheduling of charging stations 20 based on demand and route.

Per block 502 of FIG. 7, the command unit 18 is adapted to determine whether the electric vehicle 14 is currently on a planned route. If so (block 502=YES), the Module 500 proceeds to block 504 to determine whether a route deviation for the electric vehicle 14 to reach a target charging station 20 exceeds a threshold time. If so (block 504=YES), Module 500 proceeds to block 506 to continue searching for better matches of charging stations 20 and Module 500 is ended. If not (block 504=NO), Module 500 proceeds to block 508 where the information pertaining to the target charging stations 20 is sent to the electric vehicle 14 and Module 500 is ended.

If the electric vehicle 14 is not currently on a planned route (block 502=NO), the Module 500 proceeds to block 510 to determine whether the current power demand (for the virtual boxes 100) is projected to increase. The command unit 18 may employ a predictive demand algorithm to determine this. For example, if increased traffic is anticipated, requiring more energy to achieve a certain fleet task, the power demand increases. If so (block 510=YES), Module 500 loops to block 508 to send this information to the electric vehicles 14 in that virtual box and Module 500 is ended.

If not (block 510=NO), Module 500 proceeds to block 512 to determine whether the number of electric vehicles 14 that have an idle status is greater than or equal to the current power demand. If the number of idle electric vehicles 14 is greater than the current demand (block 512=YES), Module 500 loops back to block 508 to send out the information to the electric vehicles 14. If not (block 512=NO), Module 500 loops back to block 506 to continue searching for better matches of charging stations 20 and Module 500 is ended.

Figure 8:
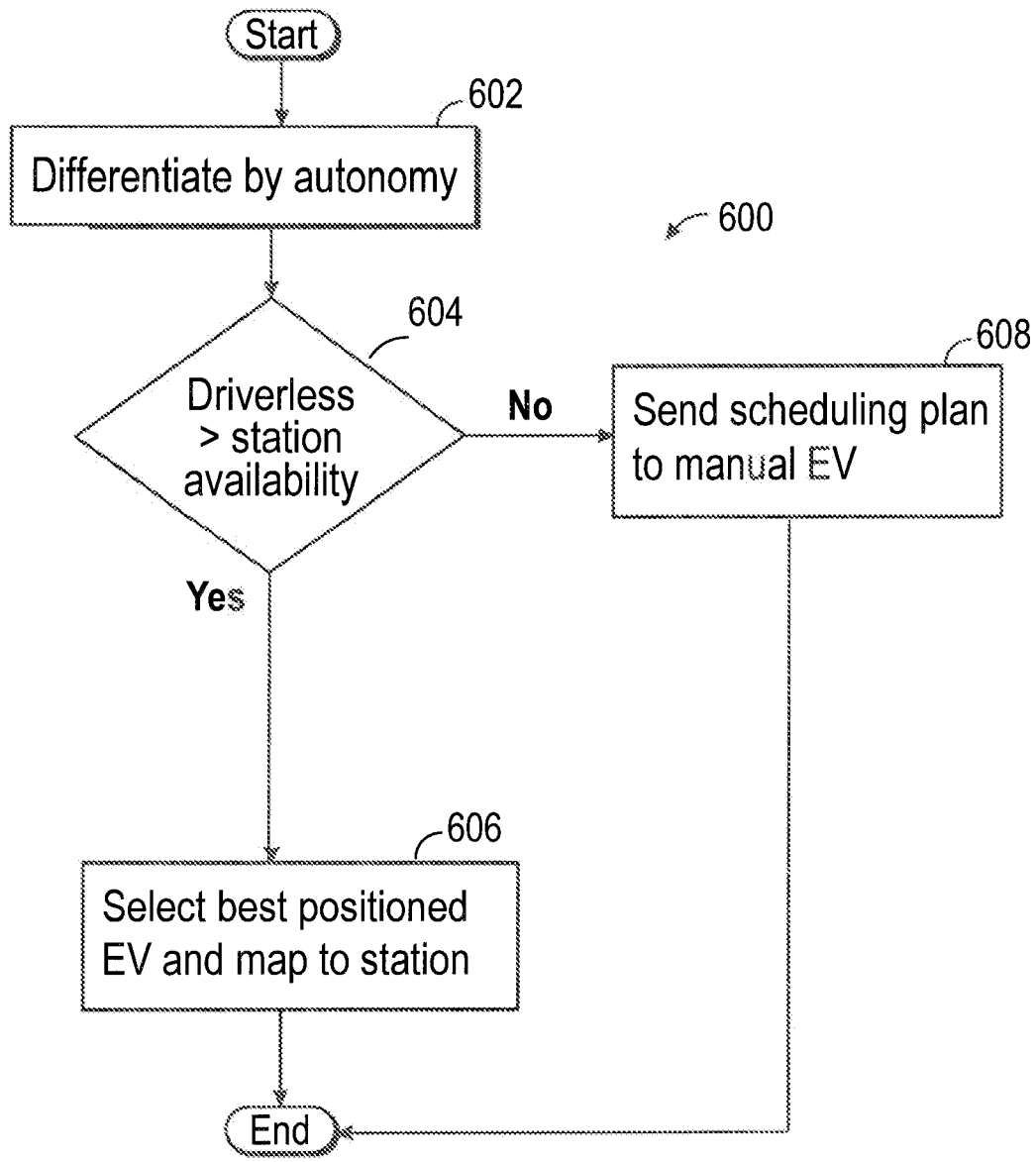
FIG. 8 is a flowchart for a fifth module executable by the command unit of FIG. 1.

Referring now to FIG. 8, an example flowchart of the Autonomy Module 600 is shown. The Autonomy Module 600 may be dynamically executed and need not be applied in the specific order recited herein. Furthermore, it is to be understood that some steps may be eliminated. The Autonomy Module 600 represents autonomy level-based optimization flow.

Per block 602 of FIG. 8, the command unit 18 is adapted to differentiate the electric vehicles 14 based on their level of autonomy. For example, several levels of autonomy may be defined, extending from fully driverless vehicles to manually operated electric vehicles 14. Proceeding to block 604, the command unit 18 is adapted to determine whether the driverless (i.e., higher-level autonomy) electric vehicles 14 are more abundant than the target charging stations 20. In other words, whether there are more driverless electric vehicles 14 than available target charging stations 20. The target charging stations 20 are defined as those that are high performing/efficient and may charge the electric vehicles 14 in the least amount of time.

If so (block 604=YES), the Module 600 proceeds to block 606 to match and direct the driverless electric vehicles 14 to available target charging stations 20. If not (block 604=NO), the Module 600 proceeds to block 608 to send a notice to the electric vehicles 14 that are manual or driver operated (i.e., lower-level autonomy) of the scheduling plan or fleet assignments. The purpose here is to facilitate energy transfer (e.g., V2V, V2G) from the electric vehicles 14 that are manually operated to the ones that are driverless. The Module 600 is then ended.

In summary, the system 10 provides various ways of optimizing charging schedules in a fleet 12. The command unit 18 is adapted to proportion battery power based on a plurality of discharge categories and make pre-emptive charging decisions based on those charge proportions. The fleet 12 is directed to charge when a discharge category goes below its respective percent allocation. The pre-emptive mapping ensures that the probability of the fleet 12 having higher multi-mode (propulsion, V2V power, V2H/V2L power) discharge capacity is greater than its demand threshold for other power needs. The benefits include an efficient time-centralized charging system, increased fleet availability and improved battery life in the electric vehicles 14.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The command unit 18 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of managing charging schedules in a fleet having electric vehicles, the system comprising:
    a command unit having a processor and tangible, non-transitory memory on which instructions are recorded, the command unit being adapted to:
        define a plurality of discharge categories, including a transportation category, a transfer category and a reserve energy category;
        proportion respective battery power in the electric vehicles by setting a respective percentage allocation for the plurality of discharge categories;
        signal the electric vehicles to respectively charge when at least one of the plurality of discharge categories falls below the respective percentage allocation;
        match the electric vehicles with a driverless status to respective target charging stations and request energy transfer from the electric vehicles with a driver-operated status to the electric vehicles with the driverless status when the respective target charging stations are not available;
        group the electric vehicles in respective virtual boxes based in part on respective physical locations of the electric vehicles and determine whether a respective total battery charge level is greater than a respective total power demand in the respective virtual boxes, the respective virtual boxes including a first virtual box and a second virtual box adjacent to the first virtual box; and
        control operation of the electric vehicle, including directing energy transfer to at least one of the electric vehicles in the first virtual box from one or more of the electric vehicles in the second virtual box when the respective total power demand in the first virtual box exceeds the respective total battery charge level in the first virtual box.

2. The system of claim 1, wherein the transportation category includes propulsion energy for the electric vehicles and non-propulsion energy for respective vehicle accessories.

3. The system of claim 1, wherein the transfer category includes vehicle-to-grid (V2G) energy transfers.

4. The system of claim 1, wherein the transfer category includes vehicle-to-load (V2L) energy transfers.

5. The system of claim 1, wherein the transfer category includes vehicle-to-home (V2H) energy transfers.

6. The system of claim 1, wherein the command unit is adapted to:
- send an alert when a number of the electric vehicles having an idle status in the respective virtual boxes is greater than a respective threshold value; and
- send the alert when a total charge level of the electric vehicles having the idle status is greater than a predetermined threshold level.

7. The system of claim 1, wherein the command unit is adapted to:
- search for a target charging station in proximity to a path when the electric vehicles having an idle status are in motion along the path; and
- match the electric vehicles having the idle status with the target charging station within the respective virtual boxes when the electric vehicles having the idle status are not in motion.

8. The system of claim 1, wherein the command unit is adapted to:
- send an alert to the electric vehicles in the respective virtual boxes if a current power demand for the respective virtual boxes is projected to increase when the electric vehicles are not on a planned route.

9. A method for managing charging schedules in a fleet having electric vehicles, the method comprising:
- installing a command unit with a processor and tangible, non-transitory memory on which instructions are recorded;
- defining a plurality of discharge categories for each of the electric vehicles, including a transportation category, a transfer category and a reserve energy category, via the command unit;
- proportioning respective battery power in the electric vehicles by setting a respective percentage allocation for the plurality of discharge categories, via the command unit;
- directing the electric vehicles to charge when at least one of the plurality of discharge categories falls below the respective percentage allocation, via the command unit;
- matching the electric vehicles with a driverless status to respective target charging stations and request energy transfer from the electric vehicles with a driver-operated status to the electric vehicles with the driverless status when the respective target charging stations are not available, via the command unit;
- grouping the electric vehicles in respective virtual boxes based in part on respective physical locations of the electric vehicles and determining whether a respective total battery charge level is greater than a respective total power demand in the respective virtual boxes, the respective virtual boxes including a first virtual box and a second virtual box adjacent to the first virtual box, via the command unit; and
- controlling operation of the electric vehicle, including directing energy transfer to at least one of the electric vehicles in the first virtual box from one or more of the electric vehicles in the second virtual box when the respective total power demand in the first virtual box exceeds the respective total battery charge level in the first virtual box, via the command unit.

10. The method of claim 9, further comprising:

sending an alert when a quantity of the electric vehicles having an idle status in the respective virtual boxes is greater than a respective threshold value; and sending the alert when a total charge level of the electric vehicles having the idle status is greater than a predetermined threshold level.

11. The method of claim 9, further comprising:

searching for a target charging station in proximity to a path when the electric vehicles having an idle status are in motion along the path; and matching the electric vehicles having the idle status with target charging stations within the respective virtual boxes when the electric vehicles having the idle status are not in motion.

12. The method of claim 9, further comprising:

sending an alert to the electric vehicles in the respective virtual boxes if a current power demand for the respective virtual boxes is projected to increase when the electric vehicles are currently not on a planned route.

\* \* \* \* \*